Patented Sept. 16, 1947

2,427,400

UNITED STATES PATENT OFFICE 2,427,400

PROCESS FOR THE MANUFACTURE OF NICOTINAMIDE

Paul W. Garbo, Brooklyn, N. Y.

No Drawing. Application June 25, 1942,
Serial No. 448,414

7 Claims. (Cl. 260—295.5)

This invention relates to the manufacture of nicotinamide.

Nicotinamide is recognized as an important pharmaceutical product prescribed instead of nicotinic acid where the latter has undesirable effects. This invention, therefore, more specifically relates to a more economical production of this highly desirable nicotinic acid compound.

Of the methods for producing nicotinamide known to me, the one proposing the conversion of ammonium nicotinate to the nicotinamide has received greatest attention by the workers in the field since, from a theoretical point of view, one might predict it to be the most direct and economical.

The essential phases of the aforementioned method of forming the nicotinamide by the aforementioned method involve the formation of ammonium nicotinate by merely neutralizing nicotinic acid with ammonium hydroxide and splitting off, with the aid of heat, a molecule of water from each molecule of ammonium nicotinate, to leave a molecule of nicotinamide. However, in the latter step, since ammonium nicotinate is not a very stable compound, heat tends to decompose the nicotinate into the original nicotinic acid and ammonia. The shortcomings of these tendencies have led to a very poor yield of nicotinamide.

Known to me also is the improvement of the aforementioned method as effected by bubbling ammonia gas through a mass of molten ammonium nicotinate undergoing the heat treatment. Thus, by bubbling ammonium gas through molten ammonium nicotinate at elevated temperatures, that is about 160 to 170° C., conversions as high as 85% were effected—that is to say, the final reaction mass would show by analysis to be comprised of about 85% nicotinamide and about 15% nicotinic acid as such, or as its salt. Even the procedure involving the bubbling of ammonia through the nicotinate to reach 85% conversion involved a time element of many hours. Prolongation of the treatment to achieve higher conversions became so unreasonably long as to be impractical commercially.

The recovery of nicotinamide from the aforementioned reaction mass has required time-consuming and expensive procedures in order to meet present stringent standards and specifications with regard to the physical properties of the end product, such as melting point, color, hydrogen ion concentration (pH), ash, etc. Also, in view of the high cost of nicotinic acid, efforts to effect economies have made it necessary to recover the unconverted nicotinic acid for resue in a subsequent reaction by means of difficult and expensive operations.

The foregoing difficulties account for the present high cost of nicotinamide as compared with nicotinic acid when from a theoretical procedural point of view, no great disparity in price should exist.

My invention is predicated upon the discovery of a mode of operation which makes it possible to have the reaction converting nicotinic acid or ammonium nicotinate to the nicotinamide progress to the stage where higher conversions of nicotinamide are secured, and thereby more economically produce nicotinamide.

My invention therefor has as its object the provision of a method to accelerate the reaction yielding nicotinamide, and further to drive the reaction to higher conversions of nicotinamide.

A still further object of my invention is to provide a method whereby solid nicotinic acid and ammonia gas are employed to produce nicotinamide.

A still further object of my invention resides in the process facilitating the recovery of high purity nicotinamide from the reaction mass, and the simplification of the method for reuse of the unconverted material entering into the reaction.

In accordance with the invention, nicotinic acid or its salt, ammonium nicotinate, in either liquid or solid state but in a greatly extended physical condition, is brought into intimate contact with an excess of ammonia at elevated temperature to produce nicotinamide. The time of contact is so adjusted that upon analyzing the reaction product a desirably high content of nicotinamide will be found therein; an excessive time of contact, however, does not adversely affect the reaction or the yield, if it is of reasonable duration.

More specifically, nicotinic acid or ammonium nicotinate or any mixture thereof, if in liquid state, is cascaded or sprayed in an atmosphere of ammonia at a temperature above about 100° C., and below about 240° C., desirably in the range of about 140° to about 200° C. and more particularly in the range of about 160° to 180° C. An efficient cascading can be securd by causing the liquid to flow down over the packing, e. g., Raschig rings, in a column, while counter-currently flowing ammonia gas upwardly in the column. If the starting material is in the solid state, it is pulverized and the resulting powder is dispersed in an atmosphere of heated ammonia. Pulverization may be accomplished not only by grinding, ball-milling etc., but also by spraydrying solutions of nicotinic acid or nicotinate.

The following specific and preferred embodiments thereof are presented as being illustrative of methods which may be employed to carry out my invention.

Example 1

Molten ammonium nicotinate formed by reacting nicotinic acid with ammonium hydroxide and heating to a temperature above 100° C. to remove the water of reaction, is sprayed as a fine mist into the top of a tall cylindrical vessel, suitably insulated or jacketed to maintain an internal temperature of 160° to 170° C. and filled with ammonia. The source of supply of the ammonia is that obtained from liquid ammonia sold in pressure cylinders. It is desirable to have the ammonia under a pressure of a few atmospheres, say two or three. The tiny particles of ammonium nicotinate slowly settle through the ammonia and during their descent are converted into particles of nicotinamide. The amide which drops down through the ammonia and runs down the walls of the vessel is collected in and drawn from the bottom of the vessel at a rate commensurate with the rate of amide formation. The ammonia, preheated to a temperature of about 180° C. is introduced into the cylindrical reactor in the vicinity of its lower end and is withdrawn near the top of the cylinder. The ammonia is fed in at a rate five to ten times the rate of evolution of water in the reaction. The vented ammonia may be passed through a suitable condenser to recover small amounts of entrained nicotinamide and nicotinate and to remove the reaction water; the residual ammonia is then ready for recirculation through the preheater and reaction vessel. By correlating the extent, i. e., fineness of spray, and time of contact of the nicotinate and the ammonia, as well as the temperature, pressure and rate of ammonia circulation, conversions of at least 90% and accelerated production rates are obtained. Whereas a charge of 200 pounds of nicotinate will normally require over ten hours to reach 85% conversion by the bubbling process hereinbefore mentioned, my invention comparatively has an output of about 100 pounds per hour of a product containing 90% or more of nicotinamide.

Example 2

A modification of the above illustration involves the use of a packed column instead of the empty reactor. In this case, the molten nicotinate, as a thin film, is caused to coat and flow down the Raschig rings which fill the column, the nicotinate moving counter-currently to the ammonia. Where it is desired to limit the height of the column, the liquid product collected at the bottom may be pumped to the top again and recirculated as many times as necessary to attain the desired amount of conversion.

With full recirculation of the liquid product, the operation is batchwise, but may be continuous if the liquid is partly recirculated and partly withdrawn from the system.

Example 3

Finely powdered nicotinic acid is thoroughly dispersed in an atmosphere of ammonia by introducing the powder into a high-velocity stream of ammonia gas at 75° C. and discharging the ammonia-nicotinic acid mixture into a settling chamber heated to a temperature of about 180° C. To assist in maintaining this reaction temperature, a further supply of ammonia alone preheated to 220° C. may be introduced into the settling chamber. A liquid product settles to the bottom of the chamber and is withdrawn. The product contains approximately 90% nicotinamide.

In each of the foregoing examples, nicotinamide of high purity is isolated from the reaction product by any of the methods known in the art, such as crystallization from a water, alcohol or acetone solution. Precipitation methods, e. g., that of United States Patent 2,280,040, granted to Seibert et al., on April 14, 1942, involving the use of copper or zinc acetate to precipitate nicotinic acid, may also be employed. Nicotinamide of very high melting point, i. e., 133° C. and a very white color, I have found, is obtainable when my reaction products are subjected to the process of my copending application, Serial No. 448,413, filed on even date, entitled Process for the treatment of nicotinic acid derivatives, to convert the residual nicotinic acid or nicotinate into nicotinyl halide which is reacted with ammonia, and are thereafter worked up to isolate the nicotinamide. In most instances it is advisable to treat with activated carbon solutions from which nicotinamide is to be recovered. Whatever method of nicotinamide purification is employed, it is clear that, since by the process of my invention conversions to 90% and more nicotinamide may be obtained, the subsequent purification steps are largely facilitated and shortened by the diminished presence of unconverted material.

Obviously, many other modifications of the basic process of my invention inherent in the procedure I have devised, viz., dispersing nicotinic acid or ammonium nicotinate in ammonia at reaction conditions, whereby its benefits will be obtained, will suggest themselves to those skilled in the art. For example, two or more reactors may be connected in series, the process may be carried out batchwise or continuously, substantial quantities of nicotinic acid may be admixed with the molten nicotinate used in the spray, and the ammonia atmosphere may be changed periodically rather than continuously to remove the reaction water which is evolved in vapor form.

Without in any way intending that I be bound by this explanation, it is pointed out that the surprising results of the process in accordance with my invention are probably ascribable to the phenomenon that the water of reaction, upon formation, is immediately withdrawn from the principal zone of reaction, thereby obviating the chance of hydrolyzing the desirable amide back to nicotinic acid. This I attribute to the mobility of the reacting ingredients in the zone of reaction, facilitating the withdrawal of the components of reaction noted.

In the prior art processes known to me, particularly that in which ammonia gas is bubbled through a liquid mass of ammonium nicotinate, it appears that the water of reaction has less opportunity of escaping, so that an equilibrium is soon reached whereby the rate of formation of the amide is no greater than that of its degradation, by hydrolysis, to nicotinic acid.

My invention, it will be observed, maintains conditions of reaction sufficiently intense to progress more rapidly and beyond yields heretofore attained, and without possible reversion to the starting material, to have this material present in excessive quantities.

Having thus described my invention and illustrated its use, what I claim as new and desire to secure by Letters Patent, is:

1. The process of producing nicotinamide which comprises dispersing a nicotinic acid compound taken from the group consisting of nicotinic acid, ammonium nicotinate and mixtures thereof, into an atmosphere of heated ammonia at a temperature above about 100° C. and below about 240° C., permitting the resulting dispersed reaction product to settle through said heated ammonia, and withdrawing the settled reaction product immediately from said heated ammonia to prevent degradation of its nicotinamide content.

2. The process of producing nicotinamide which comprises spraying molten ammonium nicotinate into an atmosphere of heated ammonia at a temperature in the range of about 140° to about 200° C., permitting the resulting reaction product in finely divided form to settle through said heated atmosphere, and withdrawing the settled reaction product immediately from said heated atmosphere.

3. The process of producing nicotinamide which comprises blowing in powdered form a nicotinic acid compound taken from the group consisting of nicotinic acid, ammonium nicotinate and mixtures thereof into an atmosphere of heated ammonia at a temperature in the range of about 140° to about 200° C., permitting the resulting reaction product in powdered form to settle through said heated atmosphere, and withdrawing the settled reaction product immediately from said heated atmosphere.

4. The process of producing nicotinamide which comprises flowing molten ammonium nicotinate in the form of thin films in contact with and counter-currently to a stream of ammonia heated to a temperature in the range of about 140° to about 200° C., continuing said flow until substantial reaction has been effected, said reaction being effected only with the heat conveyed with the reactants, collecting the resulting molten reaction product from said heated stream, and removing the collected reaction product immediately from contact wtih said heated stream.

5 The continuous process of producing nicotinamide which comprises continuously dispersing a nicotinic acid compound taken from the group consisting of nicotinic acid, ammonium nicotinate and mixtures thereof, into an atmosphere of heated ammonia at a temperature in the range of about 140° to about 200° C, collecting the resulting dispersed reaction product from said heated atmosphere, and removing the collected reaction product immediately from contact with said heated atmosphere.

6. The continuous process of producing nicotinamide which comprises continuously intermingling a stream of a nicotinic acid compound taken from the group consisting of nicotinic acid, ammonium nicotinate and mixtures thereof, in countercurrent flow relationship with a stream of ammonia heated to a temperature in the range of about 140° to about 200° C., said nicotinic acid compound being in a physical form of the class consisting of small particles, droplets and thin films, continuing said intermingling until substantial reaction has been effected, said reaction being effected only with the heat conveyed with the reactants, and thereupon immediately removing the resulting reaction product from contact with said stream of heated ammonia.

7 The process of producing nicotinamide which comprises spraying molten ammonium nicotinate into an atmosphere of heated gaseous ammonia at a temperature in the range of about 160° to about 180° C., the ammonia atmosphere being renewed progressively, permitting the molten spray particles to settle out of said heated gaseous ammonia, collecting said spray particles as a liquid and recirculating the liquid to respray the same until a content of at least about 90% nicotinamide is developed in the liquid.

PAUL W. GARBO.

REFERENCES CITED

The following references are of record in the file of this patent:

UNITED STATES PATENTS

| Number | Name | Date |
|---|---|---|
| 1,141,266 | Raschig | June 1, 1915 |
| 2,220,575 | Luscher | Nov. 5, 1940 |
| 1,988,541 | Christensen | Jan. 22, 1935 |
| 1,440,620 | Nydegger | Jan. 2, 1923 |
| 1,913,391 | Hutchinson | June 13, 1933 |
| 1,451,399 | Low | Apr. 10, 1923 |

OTHER REFERENCES

Archives Pharm. Chem., vol. 46, pages 479–97 (1939).

J. Pharm. Soc. of Japan, vol. 53, No. 10, p. 218.